US010704220B2

(12) United States Patent
Coordes (10) Patent No.: US 10,704,220 B2
(45) Date of Patent: Jul. 7, 2020

(54) ARRANGEMENT WITH A CONCRETE FOUNDATION AND A TOWER AND A METHOD FOR ERECTING A TOWER

(71) Applicant: Wobben Properties GmbH, Aurich (DE)

(72) Inventor: Thomas Coordes, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 934 days.

(21) Appl. No.: 15/106,236

(22) PCT Filed: Nov. 25, 2014

(86) PCT No.: PCT/EP2014/075541
§ 371 (c)(1),
(2) Date: Jun. 17, 2016

(87) PCT Pub. No.: WO2015/090861
PCT Pub. Date: Jun. 25, 2015

(65) Prior Publication Data
US 2016/0312431 A1    Oct. 27, 2016

(30) Foreign Application Priority Data

Dec. 18, 2013   (DE) .......................... 10 2013 226536

(51) Int. Cl.
| | | |
|---|---|---|
| E02D 27/42 | (2006.01) | |
| E04H 12/34 | (2006.01) | |
| F03D 9/25 | (2016.01) | |
| E04H 12/08 | (2006.01) | |
| E04H 12/12 | (2006.01) | |
| E04H 12/16 | (2006.01) | |
| F03D 13/20 | (2016.01) | |
| F03D 1/06 | (2006.01) | |

(52) U.S. Cl.
CPC .......... *E02D 27/425* (2013.01); *E04H 12/08* (2013.01); *E04H 12/085* (2013.01); *E04H 12/12* (2013.01); *E04H 12/16* (2013.01); *E04H 12/342* (2013.01); *F03D 1/0666* (2013.01); *F03D 9/25* (2016.05); *F03D 13/20* (2016.05); *F03D 13/22* (2016.05); *F05B 2240/912* (2013.01); *Y02E 10/721* (2013.01); *Y02E 10/726* (2013.01); *Y02E 10/728* (2013.01)

(58) Field of Classification Search
CPC ......... E02D 27/42; E02D 27/425; F03D 9/25; F03D 13/20; F03D 13/22
See application file for complete search history.

(56) References Cited

U.S. PATENT DOCUMENTS

| | | | | |
|---|---|---|---|---|
| 6,532,700 B1 * | 3/2003 | Maliszewski | ......... | E04H 12/085 52/40 |
| 6,578,329 B1 | 6/2003 | Stubler et al. | | |
| 7,980,814 B2 * | 7/2011 | Nieuwenhuizen | .... | E04H 12/085 415/119 |
| 8,146,320 B2 * | 4/2012 | Seidel | ..................... | E04H 12/08 52/651.01 |
| 8,484,905 B2 * | 7/2013 | Skjaerbaek | ............. | E04C 5/125 52/40 |
| 8,935,889 B2 | 1/2015 | Samuelsen | | |
| 9,175,670 B2 * | 11/2015 | Lockwood | .............. | E04H 12/16 |
| 9,359,993 B2 * | 6/2016 | Garcia Maestre | ...... | F03D 13/22 |
| 2010/0146890 A1 * | 6/2010 | Kristensen | .............. | E02D 27/42 52/297 |
| 2011/0232071 A1 * | 9/2011 | Knoop | .................... | B25B 23/14 29/525.02 |
| 2011/0271634 A1 * | 11/2011 | Rasmussen | ............. | F03D 13/10 52/651.02 |
| 2012/0266552 A1 * | 10/2012 | Huynh Tong | ........... | E04H 12/16 52/223.4 |
| 2013/0125480 A1 * | 5/2013 | Maestre | .................. | E02D 27/42 52/126.1 |
| 2013/0129525 A1 | 5/2013 | Pabst | | |
| 2013/0205686 A1 | 8/2013 | Kawabata | | |
| 2014/0318033 A1 * | 10/2014 | Coordes | .................. | E02D 27/42 52/40 |
| 2015/0143765 A1 * | 5/2015 | Carril Gonzalez | ... | E02D 27/425 52/296 |
| 2016/0108600 A1 * | 4/2016 | Menzel | ................... | E02D 27/42 52/223.13 |
| 2016/0305405 A1 * | 10/2016 | Kraft | ....................... | E04H 12/12 |

(Continued)

FOREIGN PATENT DOCUMENTS

| | | |
|---|---|---|
| CN | 1688809 A | 10/2005 |
| CN | 201818097 U | 5/2011 |
| CN | 102099538 A | 6/2011 |

(Continued)

*Primary Examiner* — Paola Agudelo
(74) *Attorney, Agent, or Firm* — Seed Intellectual Property Law Group, LLP (57) ABSTRACT

An arrangement with a concrete foundation and a tower for supporting a nacelle of a wind energy plant wherein the tower comprises a number of tower segments which are arranged along a tower axis and at least an uppermost tower segment comprises a head flange and a foot flange, wherein an uppermost tower segment of the number of tower segments is formed as a steel element; and a number of tension or traction wires braces the concrete foundation with the head flange of the uppermost tower segment under tensile stress. A method for erecting a tower for supporting a nacelle of a wind energy plant and to a wind energy plant comprising an arrangement according to the present embodiments.

16 Claims, 8 Drawing Sheets

(56) References Cited

U.S. PATENT DOCUMENTS

2017/0248126 A1* 8/2017 Pedersen .............. E04B 1/34357
2018/0282134 A1* 10/2018 Lagerweij ............. B66C 23/185

FOREIGN PATENT DOCUMENTS

| | | | |
|---|---|---|---|
| CN | 202596242 | U | 12/2012 |
| CN | 102859098 | A | 1/2013 |
| CN | 103422702 | A | 12/2013 |
| DE | 10230273 | B3 | 2/2004 |
| DE | 102010015075 | A1 | 10/2011 |
| DE | 102011090194 | A1 | 7/2013 |
| EP | 1262614 | A2 | 12/2002 |
| JP | 2005180082 | A | 7/2005 |
| JP | 2009019550 | A | 1/2009 |
| KR | 1020120077650 | A | 7/2012 |
| WO | 2004031578 | A1 | 4/2004 |
| WO | 2008000265 | A1 | 1/2008 |
| WO | 2010006659 | A1 | 1/2010 |
| WO | 2011058158 | A1 | 5/2011 |

* cited by examiner

ARRANGEMENT WITH A CONCRETE FOUNDATION AND A TOWER AND A METHOD FOR ERECTING A TOWER

BACKGROUND

Technical Field

The invention relates to an arrangement with a concrete foundation and a tower for supporting a nacelle of a wind energy plant and to a method for erecting a tower of a wind energy plant, as well as to a wind energy plant comprising an arrangement.

Description of the Related Art

Arrangements with a concrete foundation and a tower for a wind energy plant are fundamentally known from the prior art. Typically a concrete foundation is provided on which several tower segments are arranged and connected, wherein the individual tower segments are usually prefabricated as rings or ring segments, transported to the construction site and connected to one another there. It is known by way of example to brace individual concrete tower segments or to screw together steel tower segments. It has hereby been shown that there is a very high demand for connecting means, which not only leads to a high material use, but is also unfavorable from the static point of view.

It would therefore be desirable to provide an arrangement with a concrete foundation and a tower for a wind energy plant wherein only a small number of tower segments and tensioning means are used for the tower and the tower has at the same time good static properties.

Different solutions for support or tower arrangements for wind energy plants are known from the prior art.

By way of example a tower-like support structure with several concrete elements and a steel mast is known from the document DE 10 2011 090 194 A1. The numerous concrete elements are arranged one above the other on a foundation and are connected together wherein the lower concrete elements are at first braced together and then the steel mast is arranged on the braced concrete elements by means of screws.

A wind energy plant tower is also known from the document DE 10 2010 015 075 A1 and comprises a plurality of concrete tower segments arranged one above the other.

The German Patent and Trade Mark Office has searched the following relevant documents WO 2011/058158 A1, DE 102 30 273 B3, WO 2008/000265 A1, JP 2005180082A, WO 2010/006659 A1, EP 1262614 A2, JP 2009019550A and KR 1020120077650A.

Even with the solutions known from the prior art however a large number of tower segments and tensioning means are used which leads to a high cost and material expense.

BRIEF SUMMARY

Embodiments provide an improved arrangement with a concrete foundation and a tower for a wind energy plant. More particularly a concrete foundation and a tower for a wind energy plant, as well as a method for erecting a tower for a wind energy plant are provided, in which a low number of tower segments and connecting elements between the foundation and tower segments are required wherein the tower has at the same time sufficiently good static properties in order to support a nacelle of a wind energy plant.

Provided is an arrangement with a concrete foundation and a tower for supporting a nacelle of a wind energy plant wherein the tower comprises a number of tower segments which are arranged along a tower axis and at least one uppermost tower segment comprises a head flange and a foot flange wherein an uppermost tower segment of the number of tower segments is formed as a steel element; and a number of tension or traction wires braces the concrete foundation with the head flange of the uppermost tower segment under tensile strain.

Further provided is a method for erecting a tower for supporting a nacelle of a wind energy plant, wherein the method comprises the following steps, namely setting up a first tower segment of a number of tower segments on a concrete foundation; connecting the concrete foundation and the first tower segment by means of releasable connecting means; bracing the concrete foundation with the uppermost tower segment of the number of tower segments by means of a number of tension or traction wires, wherein the tension or traction wires connect the concrete foundation and the head flange of the uppermost tower segment, and the uppermost tower segment is formed as a steel element.

Further provided is a wind energy plant having a tower, a concrete foundation and a nacelle, wherein a rotor with three rotor blades is arranged on the nacelle, and during operation of the wind energy plant the rotor is set into a rotational movement and drives a generator, wherein the tower and the concrete foundation form an arrangement.

In the following the concept of the invention is described by way of an example—without this thereby restricting the invention in any way. The invention relates to an arrangement, more particularly a cylindrical and/or conical, tower-like hollow supporting arrangement, with a number i of tower segments, wherein i can assume the numerical values 1, 2, . . . , n. The tower segments, more particularly the uppermost tower segment is thereby braced with a concrete foundation of the arrangement by means of tension or traction wires, wherein the uppermost tower segment is a steel element, and the tension or traction wires connect a flange at the upper end of the uppermost tower segment to the concrete foundation. As opposed to tower segments which are conventionally screwed together, with the arrangement significantly fewer fastening and connecting means are required which leads to a lesser use of materials and thus to cost advantages. It was furthermore recognized that it is possible to provide an arrangement which has good static properties, although a braced connection of this kind also produces an additional load in the tower.

This and further preferred configurations are the subject of the dependent claims and specify both the arrangement and also the method for producing a tower and for producing a wind energy plant in further detail. In particular preferred further developments form the subject of the dependent claims and provide in detail advantageous possibilities as to how the arrangement/method explained above is to be embodied and configured within the scope of the problem posed as well as with regard to further advantages.

Fundamentally a number of one or more tower segments can be braced together.

One preferred configuration proposes that the arrangement, more particularly the number of tower segments, comprises solely a single tower segment which is arranged with the foot flange on the concrete foundation. With this configuration in order to form the tower only a single tower segment (i=1) is used which then forms at the same time the uppermost and lowermost (steel) tower segment which is then braced with the concrete foundation via the tension or traction wires. With this configuration the tower is solely formed by a single steel tower segment so that the tower is formed solely from steel (steel tower), wherein here at least the single steel tower segment is braced with the concrete foundation via tension or traction wires. By the tower segment is meant a cylindrical and/or conical ring or ring segment which to form the tower is arranged along the tower axis. The nacelle of the wind energy plant is here expressly understood as not being a tower segment. With an expedient design it can be proposed that the arrangement comprises several tower segments which are arranged one above the other on the concrete foundation along the tower axis. With this embodiment the arrangement comprises in total a number i of tower segments, wherein i≥2. The tower is preferably formed by means of two, three, four or five tower segments wherein then the uppermost tower segments in the direction of the tower axis is a steel segment which is braced with the concrete foundation via the tension or traction wires. Alternatively, more particularly as a preferred variation, the tower can also be formed from several steel tower segments so that the tower is formed exclusively of steel (steel tower) wherein also here at least the uppermost steel tower segment is braced with the concrete foundation via tension or traction wires. By tower segments are understood cylindrical and/or conical rings or ring segments which are arranged one above the other along the tower axis to form the tower. The nacelle of the wind energy plant is here understood expressly as not being a tower segment.

A preferred further development proposes that ten, preferably seven, and even more preferred, five, tension or traction wires brace the concrete foundation with the head flange of the uppermost tower segment under tensile stress and that the respective tension or traction wires are spread out at equidistant spacing from one another. As opposed to conventional tower segments which are screwed to one another, thus instead of typically 150 screws, clearly fewer tension or traction wires, thus a single or double figure number of tension or traction wires, are required in order to brace the tower. The numerous tension or traction wires are thereby spread out circumferentially in the tower equidistantly spaced from one another, so that the load is spread out evenly to the relevant number of tension or traction wires.

In an advantageous configuration it can be proposed that the head flange and/or the foot flange of at least one of the tower segments comprises bores. With this embodiment it is proposed that the tension or traction wires are guided through the bores in the head or foot flange of the tower segments and are braced. In yet another configuration, by way of example if the tower is formed by several tower segments, it can also be proposed that the tension or traction wires are guided only through the bores of the foot flange of the lowermost tower segment and the bores in the head flange of the uppermost tower segments. The tension or traction wires are guided past the other of the other tower segments. It can also then be proposed that only the uppermost and the lowermost tower segment have such guide bores. Further combinations can also be provided without limitation.

A preferred further development proposes that the diameter of at least one of the segments becomes smaller upwards along the tower axis, wherein at least one part of the outer side of the tower segment includes with the tower axis an angle of between one degree (1°) and ten degrees (10°). It is hereby proposed in a particular way that the tower, more particularly a tower segment, tapers upwards in the vertical direction along the tower axis. The outer side of a tower segments preferably includes with the tower axis an angle of five degrees (5°) and even more preferably an angle in the region of between one and two degrees (1° to 2°). It can also hereby be proposed that a tower segment has initially a cylindrical portion and then an (angled) conical portion wherein then only the surface of the conical tower segment portion includes one of the aforementioned angles with the tower axis. It can likewise be proposed, more particularly if the tower is formed with several tower segments, that the individual tower segments have different angles, by way of example a lowermost tower segment has an angle of five degrees (5°) and the tower segment arranged above same along the tower axis has an angle of two degrees (2°) so that a stepped taper of the tower is produced.

Again another further development can be proposed in that at least one of the number of tower segments, more particularly the lowermost tower segment which is arranged adjacent the concrete foundation, is a concrete segment. This embodiment involves a so-called hybrid tower in which by way of example a lowermost or several lowermost tower segment(s) is/are formed as concrete segment(s) and the uppermost or several uppermost tower segment(s) is/are formed as a steel element(s), and the uppermost steel element, more particularly the head flange of the uppermost steel element, is braced with the concrete foundation via tension or traction wires.

A preferred configuration proposes that at least the head flange and/or the foot flange of the uppermost tower segment is/are formed L-shaped or T-shaped. It is hereby proposed in a special way to design the head flange of the uppermost, and/or the foot flange of the lowermost, tower segment L-shaped or T-shaped so that it is possible to provide in the horizontal portion of the flange, recesses, more particularly bores, through which the tension or traction wires can be guided. Alternatively or additionally the further tower segments—where present—can also have L-shaped head and/or foot flanges. It can also be proposed that some of the several tower segments, more particularly the concrete tower segments, hereby have no L-shaped flanges, and are thereby connected to tower segments which in turn have L-shaped flanges.

A preferred embodiment relates to an arrangement in which the concrete foundation and the lowermost tower segment and/or adjacent tower segments are formed to engage in one another with positive locking engagement. By way of example the concrete foundation and the lowermost tower segment and/or adjacent tower segments hereby comprise a type of tongue and groove so that they can be arranged with positive engagement in one another. This is particularly advantageous if the tower segments are provisionally arranged on one another before they are finally braced with the traction or tension wires, wherein only the uppermost steel element, more particularly the head flange of the uppermost steel element, is braced with the concrete foundation via tension or traction wires.

An advantageous embodiment relates to an arrangement in which the concrete foundation and the lowermost tower segment and/or adjacent tower segments can be connected by means of releasable connecting means. It is hereby proposed in particular that the concrete foundation and/or tower segments are to be provisionally connected by way of example by means of screws, bolts, rivets before the tower, more particularly the concrete foundation and the uppermost tower segment, is braced by means of the tension and/or traction wires.

A particularly advantageous configuration relates to an arrangement in which the tension or traction wires each comprise a tie rod which is arranged on the head flange of the uppermost tower segments, and a fixed anchor which is arranged on the concrete foundation, wherein the tie rod has engagement means which when actuated brings the relevant tension or traction wires under tensile stress.

With an expedient embodiment it can be proposed that the tower has a height in the region of between 20 and 150 meters, preferably at least 70 meters. It is hereby proposed in a special way that by way of example a single tower segment with a length of substantially 30 meters or two tower segments with a length of substantially 60 meters are arranged on the concrete foundation to form a tower along a tower axis. However, a number of tower segments each with a length measurement of 10 to 40 meters, preferably 20 to 30 meters, are preferably arranged on the concrete foundation. This essentially thereby means that there is a deviation of +/−2 m.

Embodiments of the invention will now be described below with reference to the drawings and in comparison with the prior art which is likewise illustrated in part. The embodiments are not necessarily shown true to scale, but rather the figures, where applicable for better explanation, are shown in diagrammatic and/or slightly distorted form. For a better understanding of the teaching which can be discerned directly from the figures, reference is made to the pertinent prior art. It is thereby to be taken into account that numerous modifications and alterations relating to the form and detail of an embodiment can be undertaken without deviating from the general idea of the invention. The features of the invention disclosed in the description, figures as well as in the claims, can be essential for the further development of the invention both individually and also in any combination. In fact all combinations of at least two of the features disclosed in the description, the figures and/or the claims, fall within the scope of the invention. The general idea of the invention is not restricted to the exact form or the detail of the preferred embodiment described and illustrated below, or restricted to an object which would be restricted in comparison with the object claimed in the claims. In the case of the dimension ranges indicated, values lying within the said limits are also to be disclosed as limit values and can be used in any way and can be claimed. Identical or similar parts or parts of identical or similar function are for simplicity provided with an identical reference numeral where appropriate.

BRIEF DESCRIPTION OF THE SEVERAL VIEWS OF THE DRAWINGS

Further advantages, features and details of the invention are apparent from the following description of the preferred embodiments as well as from the figures.

The figures show in detail.

DETAILED DESCRIPTION

Figure 1:
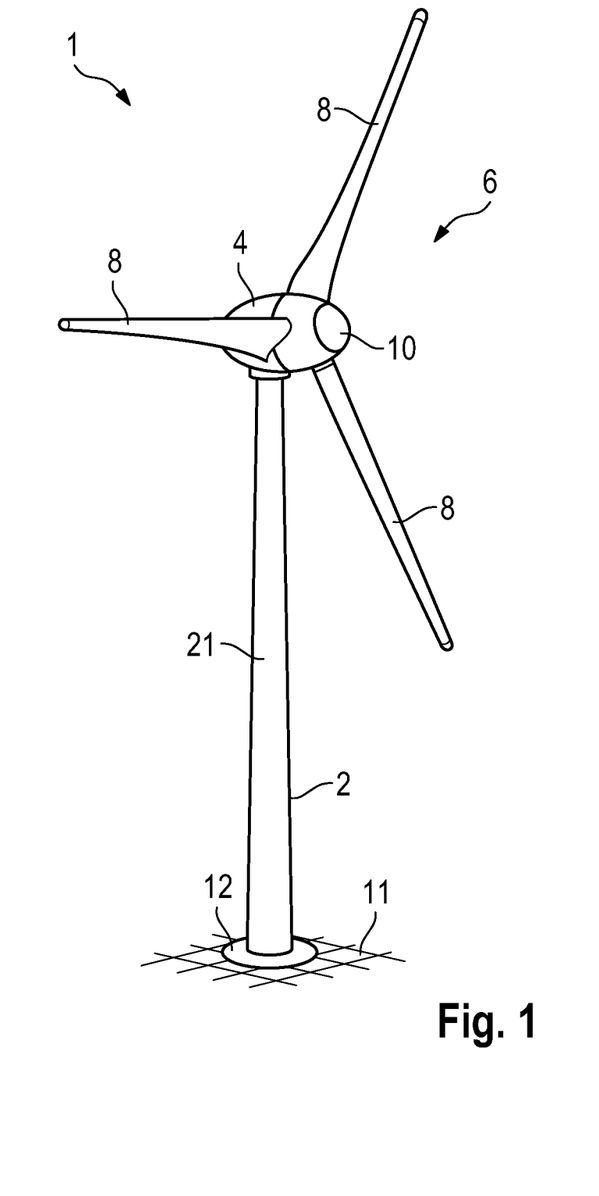
FIG. 1 is a diagrammatic illustration of a preferred embodiment of a wind energy plant.

FIG. 1 shows by way of example a wind energy plant 1 with a tower 2 and a foundation, more particularly a concrete foundation 12, and a nacelle 4. The concrete foundation 12 is thereby arranged underground and finishes flush, although not necessarily, with the ground 11 or the surface of the base. The tower 2 is formed with a single or several tower segments 21 which is/are arranged on the concrete foundation 12. The tower segment 21 is formed as a steel element. The steel element is formed as a cylindrical or conical hollow tower segment, and is connected inside to the concrete foundation 12.

A rotor 6 with three rotor blades 8 and a spinner 10 is arranged on the nacelle 4. The rotor 6 is set in operation in a rotational movement through the wind and thereby drives a generator (not shown) inside the nacelle 4. The mechanical energy of the rotational movement is converted by means of the generator into electric energy and can then be fed into a power network.

Figure 2:
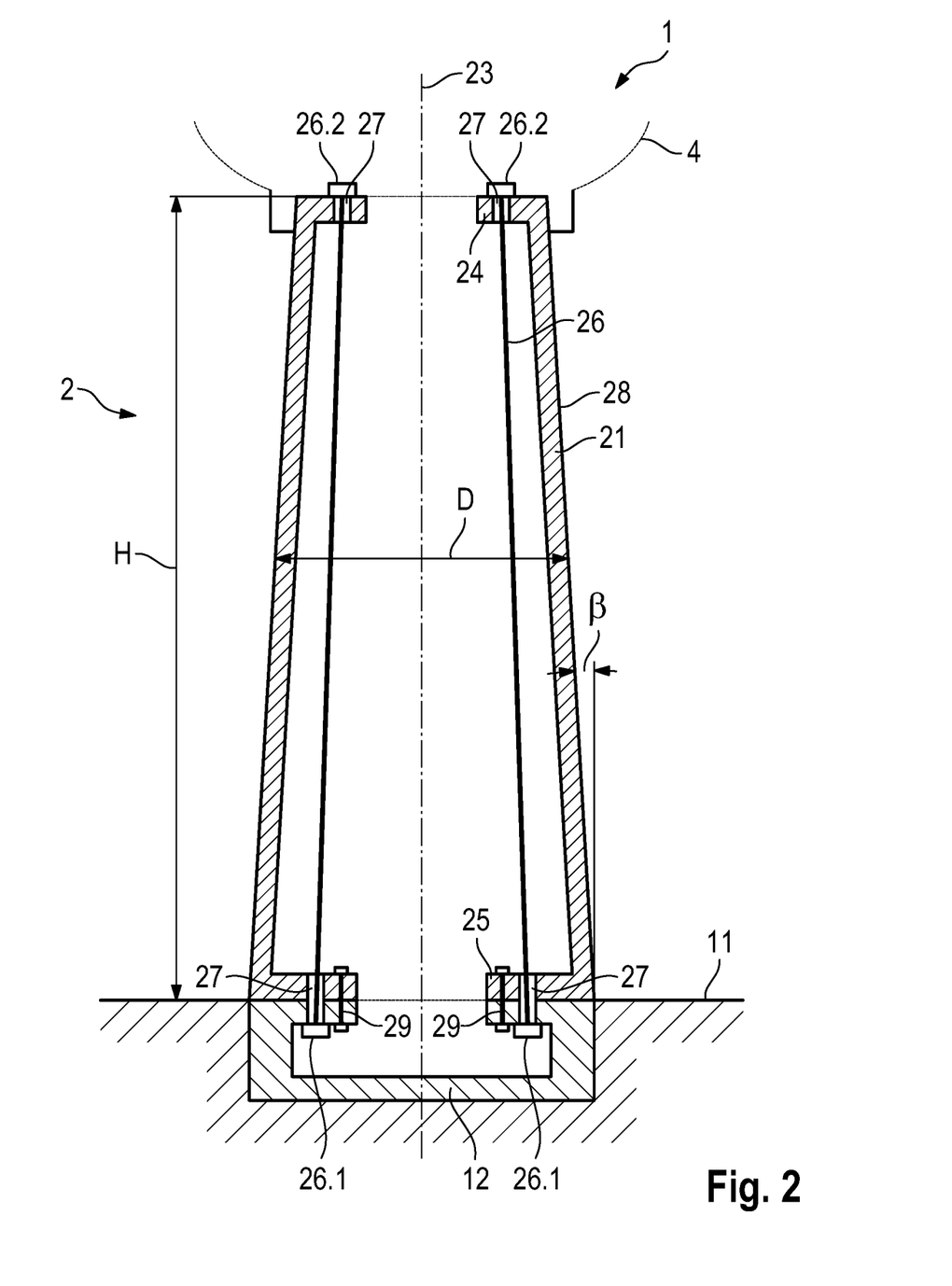
FIG. 2 is a diagrammatic illustration of a preferred embodiment of an arrangement with a tower and a foundation.

FIG. 2 shows an embodiment for an arrangement with a foundation, more particularly a concrete foundation 12, and a tower 2 for supporting a nacelle 4 of a wind energy plant 1. The tower 2 and the concrete foundation 12 are shown in cross-section, and together form a support arrangement, more particularly a conical, tower-like hollow support structure, for a nacelle 4 (indicated only diagrammatically) of a wind energy plant 1.

Here the tower 2 comprises a single tower segment 21 which is arranged on the concrete foundation 12 and along a tower axis 23. The tower segment 21 is formed as a conical steel element and comprises a head flange 24 and a foot flange 25, wherein the foot flange 25 is arranged adjacent the concrete foundation 12 and the head flange 24 is arranged adjacent the nacelle 4. The tower segment 21, more particularly the head flange 24 of the tower segment 21, is braced with the concrete foundation 12 via a number of tension or traction wires 26. By way of example a single-digit or double-digit number of tension or traction wires 26 are used in order to brace the concrete foundation 12 with the head flange 24 of the tower segment 21 under tensile stress. The number of tension or traction wires are thereby spread out circumferentially in the tower spaced equidistant from one another, so that the load is distributed evenly to the relevant number of tension or traction wires.

For this the tower segment 21 is presently formed with an L-shaped head flange 24 and an L-shaped foot flange 25 wherein bores 27 are provided in a horizontal portion of the head flange 24 and the foot flange 25 so that the tension or traction wires can be guided through same. The tension and traction wires 26 are each formed with a tie rod 26.2 which is arranged on the head flange of the tower segment 21, and with a fixed anchor 26.1 which is arranged on the concrete foundation 12. The tie rod hereby has engagement means by way of example screws or screw heads, which when actuated, more particularly through rotation of the screws or screw heads, place the relevant tension or traction wires 26 under tensile stress.

Furthermore the tower segment 21 is designed conical so that a diameter D becomes smaller upwards along the tower axis 23, wherein an outer side 28 of the conical tower segment 21 includes with the tower axis 23 an angle β between 1° and 10°. Preferred hereby is an angle of β=2° and even more preferred β=1°.

In total the tower has a height H of at least 30 meters. By way of example a single tower segment 21 with a length of substantially 30 m can hereby be used. In another embodiment the tower can also be formed with two or more tower segments, each having a length of substantially 30 m. Substantially means here the deviation is +/−2 m herefrom.

Figure 3:
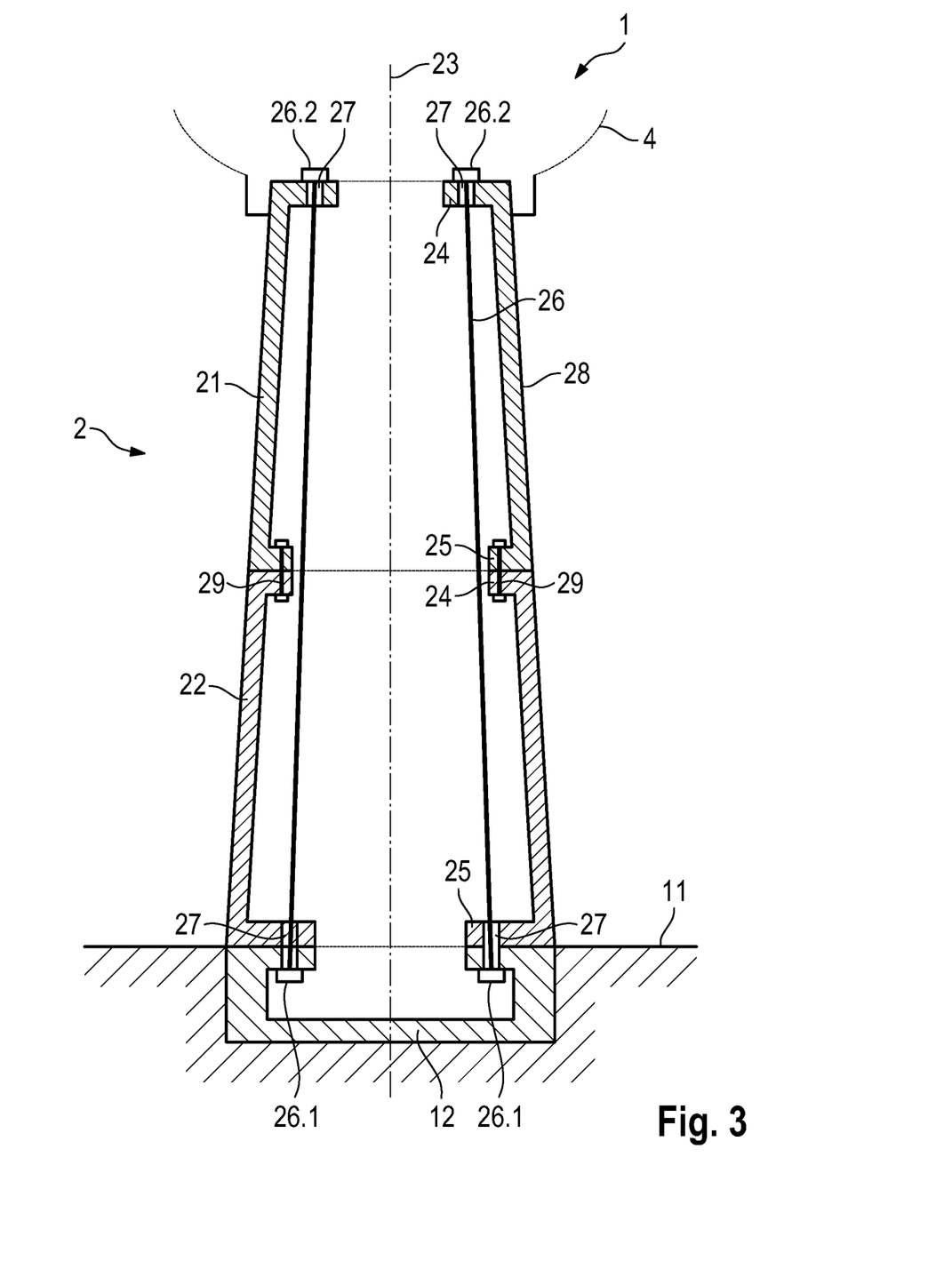
FIG. 3 is a diagrammatic illustration of a further preferred embodiment for an arrangement with a tower and a foundation.

FIG. 3 shows a further embodiment for an arrangement with a foundation, more particularly a concrete foundation 12, and a tower 2 for a nacelle 4 (shown only diagrammatically), of a wind energy plant 1, wherein identical or similar parts or features are provided with the same reference numerals as in the previous figures.

As opposed to the arrangement as shown in FIG. 2, the arrangement illustrated in FIG. 3, more particularly the tower 2, is formed with more than one tower segment, more particularly with a lowermost tower segment 22 and an uppermost tower segment 21, wherein both tower segments 22 and 21, but more particularly however the uppermost tower segment 21, is formed as a steel element. It is also possible without restricting the invention to provide even more than two tower segments, by way of example three, four or five steel tower segments.

Here both tower segments each comprise a head flange 24 and a foot flange 25. The lowermost tower segment 22 is arranged with the foot flange on the concrete foundation 12. The two tower segments 22 and 21 are arranged one above the other along a tower axis 23, wherein the foot flange 25 of the uppermost tower segment 21 is arranged on the head flange 24 of the lowermost tower segment 22.

Here the concrete foundation 12 is braced with the head flange of the uppermost tower segment 21 by means of tension or traction wires 26. By way of example a single-figure or double-figure number of tension or traction wires 26 are used in order to brace the concrete foundation 12 with the head flange 24 of the uppermost tower segment 21 under tensile stress. The tension or traction wires 26 thereby each comprise a tie rod 26.2 which is arranged on the head flange of the tower segment 21, and a fixed anchor which is arranged in the concrete foundation 12. Both the uppermost and the lowermost tower segments 21, 22 are thereby formed with an L-shaped head and foot flange, which each have bores 27 through which the tension or traction wires 26 can be guided. Here the tension or traction wires 26 are only guided through the bores 27 of the head flange 24 of the uppermost tower segment 21 and through the foot flange 25 of the lowermost tower segment 22. Alternatively or additionally the tension or traction wires 26 can also be guided through bores (not shown) in the relevant other head and/or foot flanges, by way of example in the middle of the arrangement.

The two tower segments 21 and 22 and/or the concrete foundation 12 can furthermore be (provisionally) connected to one another by means of releasable connecting means 29, such as, e.g., screws, bolts, rivets etc. so that when erecting the tower 2 to support a nacelle 4 of a wind energy plant 1 the tower segments 21 and 22 can be provisionally arranged on the concrete foundation 12 and connected by means of the releasable connecting means 29. The tower 2 can then be braced with the tension or traction wires 26. The concrete foundation 12 can also additionally be connected provisionally to the lowermost tower segment 22 by means of the connecting means 29. Here the connecting means 29 are arranged parallel to the tower axis 23. Alternatively or additionally connecting means 29 can also be provided which are arranged perpendicular to the tower axis 23.

FIG. 4 shows again another embodiment for an arrangement with a concrete foundation 12 and a tower 2 for a nacelle 4 of a wind energy plant 1. Again the same reference numerals are used for the same features.

Figure 4:
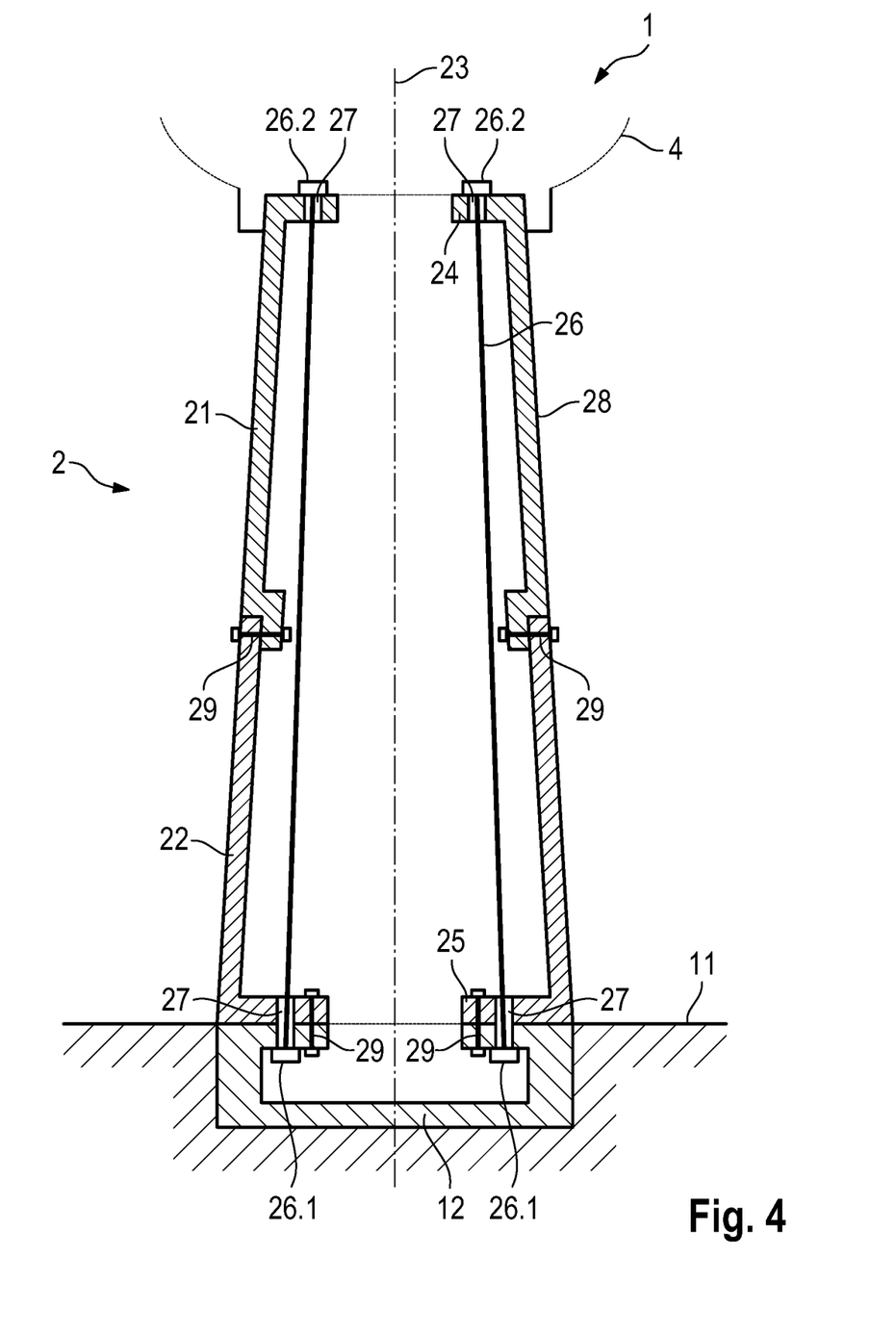
FIG. 4 is, again, a diagrammatic illustration of another preferred embodiment for an arrangement.

The arrangement illustrated in FIG. 4 is similar to the arrangements as already described and illustrated in FIGS. 2 and 3. As opposed to the preceding arrangements, the arrangement according to FIG. 4 is however formed with an uppermost and a lowermost tower segment which engage in one another with positive locking engagement. The uppermost tower segment 21 and the lowermost tower segment 22 can hereby in turn be connected via releasable connecting means 29, more particularly screws, bolts, rivets. The two adjacent tower segments 21, 22 comprise hereby by way of example also a type of tongue and groove so that they can be arranged with positive locking engagement in one another. This is particularly advantageous if the tower segments are provisionally arranged on one another before they are finally braced with the tension or traction wires.

Figure 5:
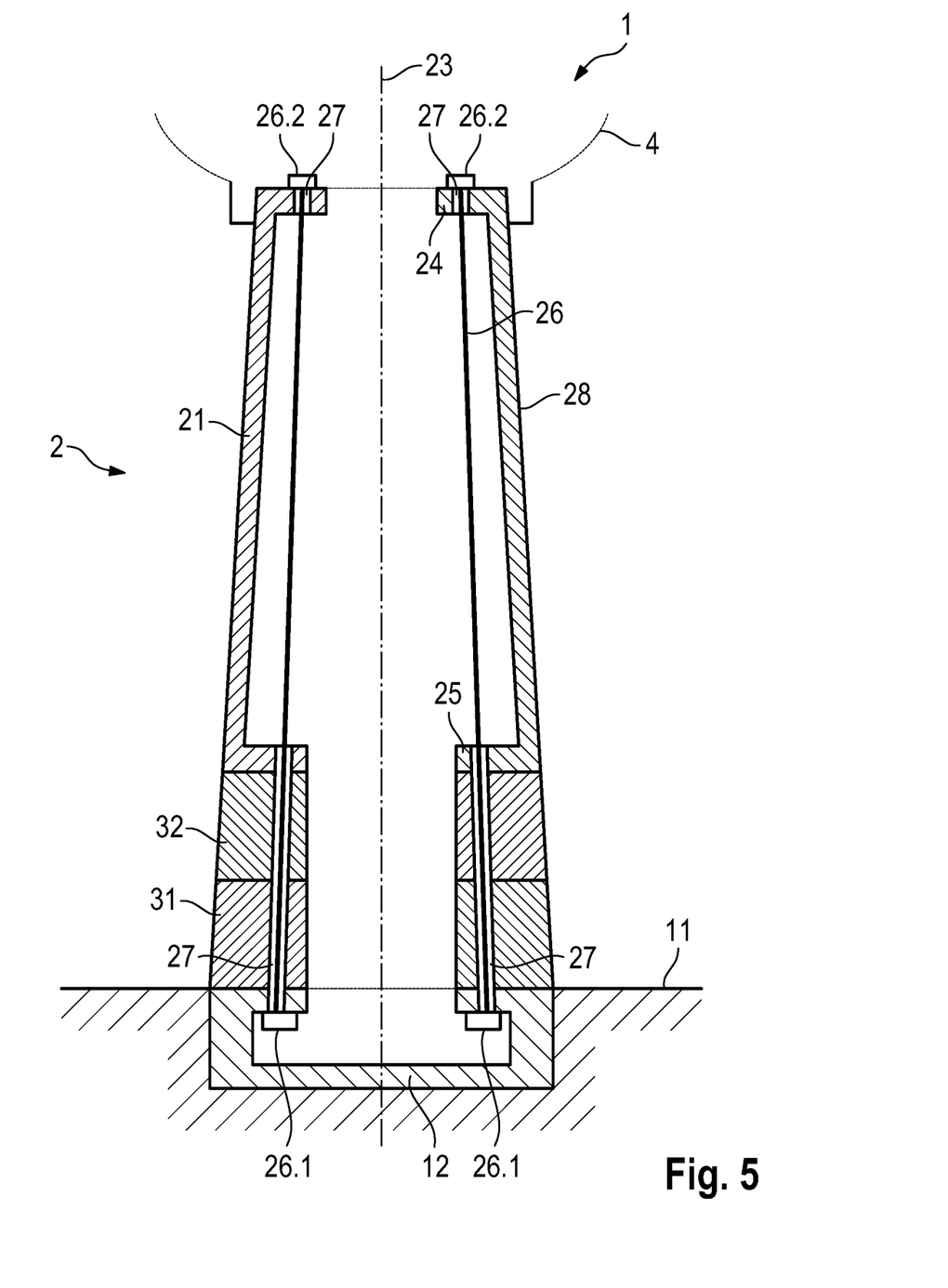
FIG. 5 is a diagrammatic illustration of a preferred embodiment for an arrangement.

FIG. 5 shows a further embodiment for an arrangement with a concrete foundation 12 and a tower 2 for a nacelle 4 of a wind energy plant 1. Again the same reference numerals are used for the same features.

The arrangement illustrated in FIG. 5, more particularly the tower 2, is formed with in total three tower segments. Here two tower segments of concrete are arranged along the tower axis 23 on the concrete foundation 12. However more or fewer concrete tower segments can be provided without limitation. An uppermost tower segment 21 which is formed as a steel element is arranged on the two concrete segments. The concrete foundation 12 is braced through a number of tension or traction wires with the head flange of the uppermost tower segment 21, namely the steel element.

Figure 6:
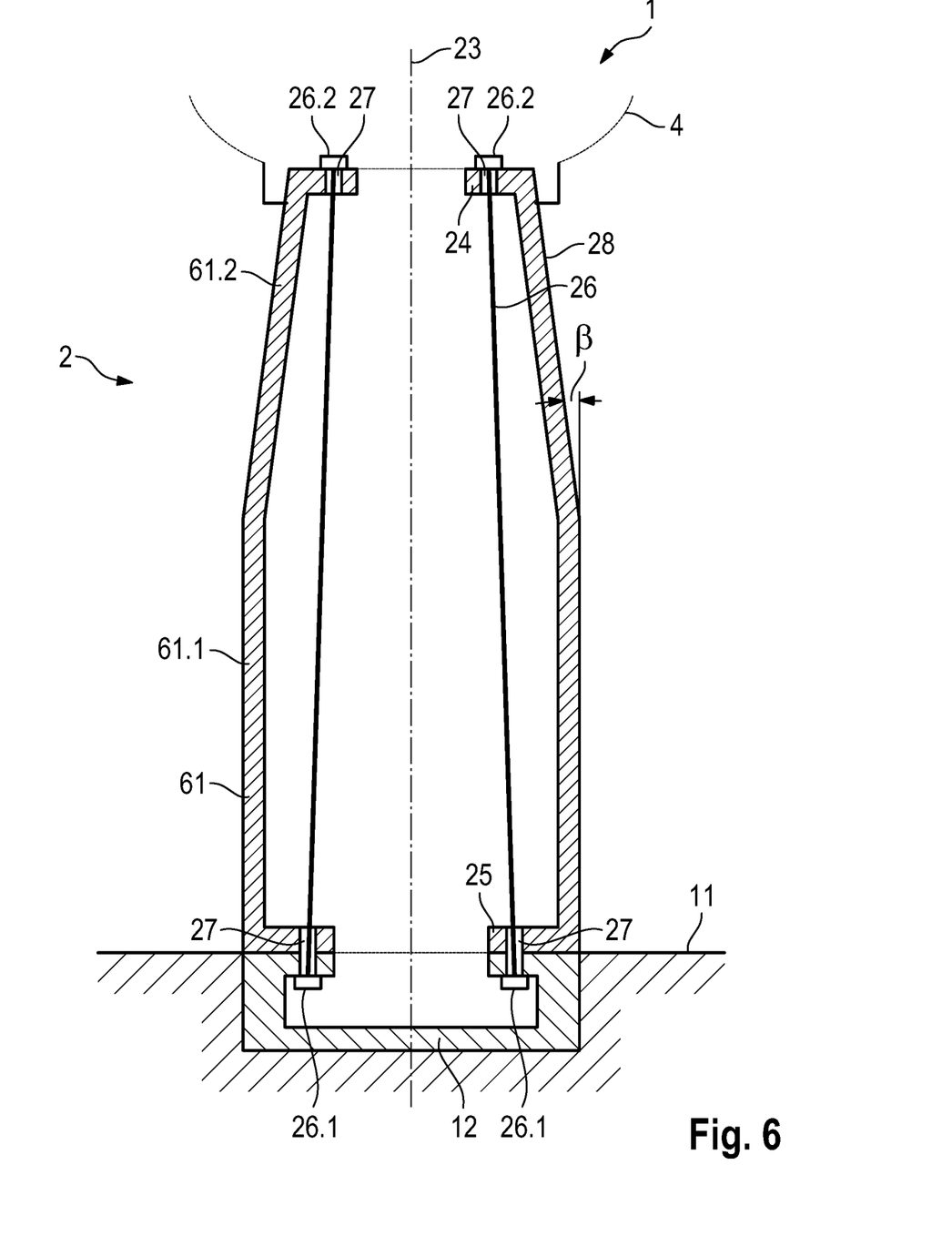
FIG. 6 is, again, a diagrammatic illustration of another preferred embodiment for an arrangement.

FIG. 6 shows in turn another embodiment for an arrangement with a concrete foundation 12 and a tower 2 for a nacelle 4 of a wind energy plant 1 wherein also here the same reference numerals are used for the same features.

The embodiment illustrated in FIG. 6 corresponds substantially to the embodiment as described and illustrated in FIG. 1, namely an arrangement, more particularly a tower 2 with a single tower segment 61. As opposed to the arrangement as illustrated in FIG. 1, the embodiment illustrated in FIG. 6 is formed with a tower segment 61 which is formed with a cylindrical portion 61.1 and a conical portion 61.2. The "bent" tower segment 61 is arranged with the cylindrical portion 61.1 on the concrete foundation 12 and with the conical portion 61.2 adjacent the nacelle 4. The conical portion 61.2 of the tower segment 61, more particularly the surface 28 of the conical portion 61.2 forms an angle β with the tower axis 23. The angle β between the outer side 28 of the tower segment 61 and the tower axis 23 preferably forms an angle between 1° and 10°, preferably of 5° and even more preferably of 2°.

Figure 7A:
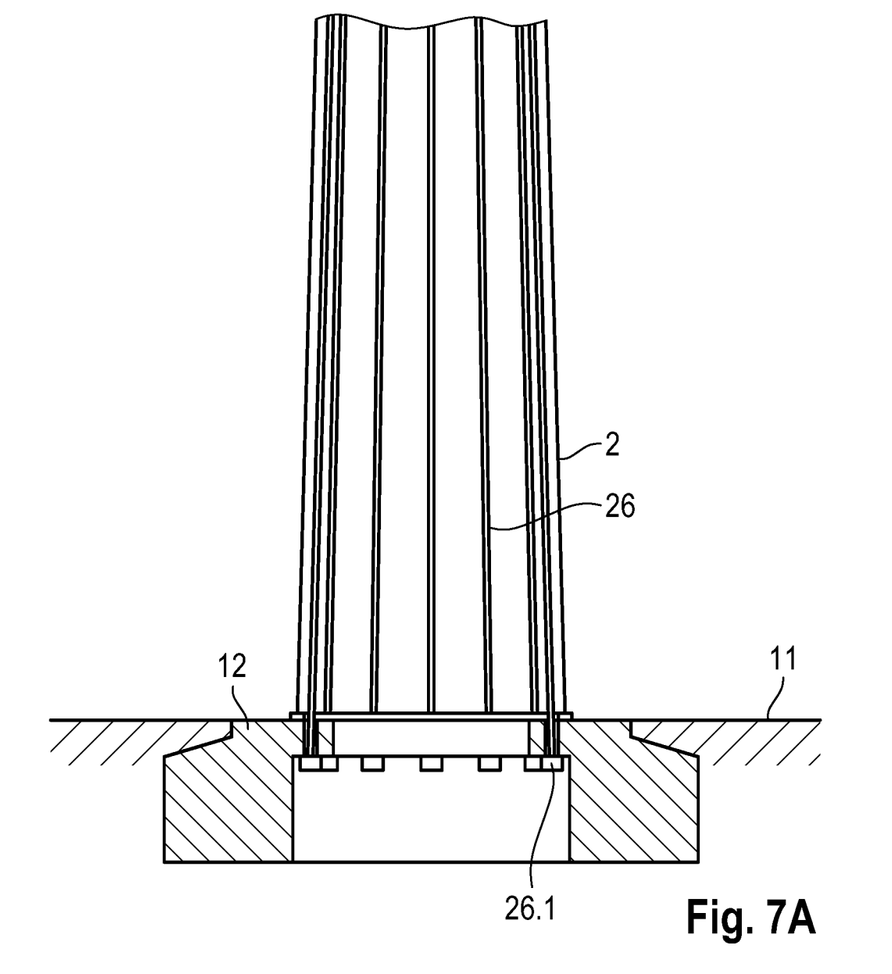
FIGS. 7A to 7C are three diagrammatic illustrations of possible preferred embodiments for a concrete foundation.
Figure 7B:
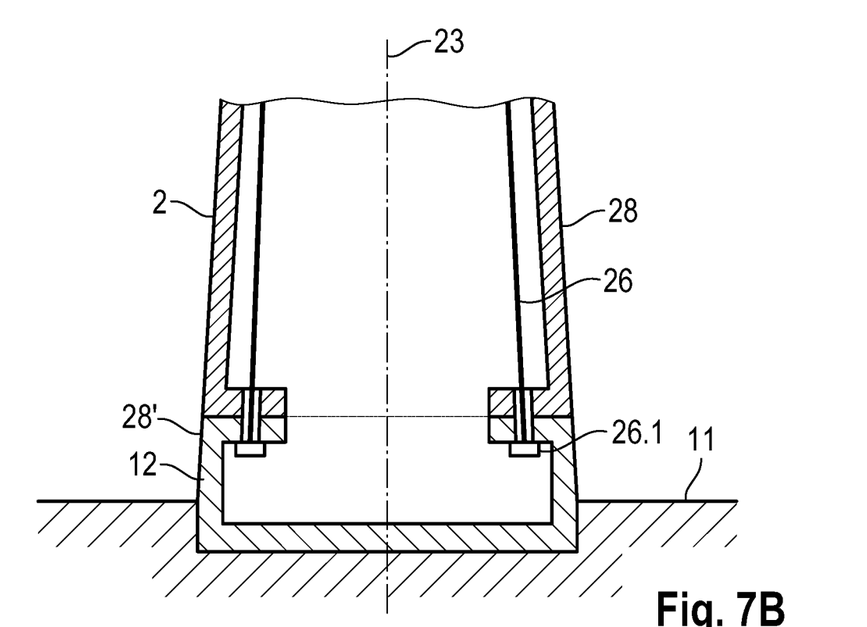
Figure 7C:
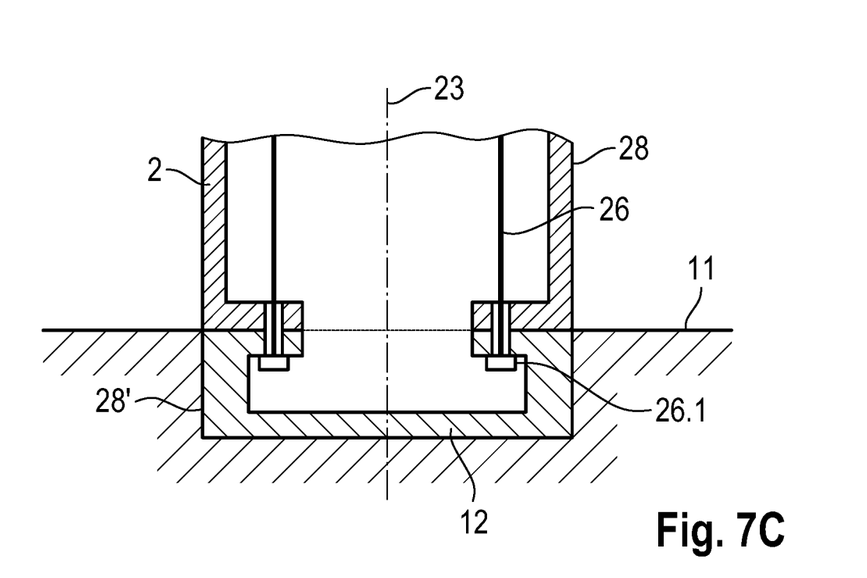

FIGS. 7A to 7C show three possible configurations for a concrete foundation 12 wherein in FIGS. 7A to 7C the same reference numerals are used for the same features. A concrete foundation 12 and a tower 2, more particularly a lowermost tower segment, are each shown. The concrete foundation 12 is braced with the head flange of the uppermost tower segment 21, a steel element, by means of tension or traction wires.

FIG. 7A shows an embodiment in which the concrete foundation 12 is arranged underneath the ground 11. It can also be proposed that the concrete foundation 12 is arranged only partially underneath the ground 11, thus underground, as shown by way of example in FIGS. 7B and 7C. It can also be proposed that the outer side 28' of the concrete foundation 12 closes flush with the outer side 28 of the tower 2, more particularly with the lowermost tower segment, wherein a part of the outer side 28' of the concrete foundation 12 is then formed cylindrical (see FIGS. 7B and 7C) and/or conical (see FIG. 7C).

The invention claimed is:

1. An arrangement comprising:
a concrete foundation;
a tower supported on the concrete foundation and for supporting a nacelle of a wind energy plant, wherein the tower comprises one or more tower segments, wherein the one or more tower segments is or includes at least one uppermost tower segment that is arranged along a tower axis, the at least one uppermost tower segment comprising a head flange and a foot flange, wherein all of the one or more tower segments of the tower are made of steel; and
a plurality of tension or traction wires connecting the concrete foundation with the head flange of the at least one uppermost tower segment under tensile stress.

2. The arrangement according to claim 1 wherein the at least one uppermost tower segment is a single tower segment arranged with the foot flange on the concrete foundation.

3. The arrangement according to claim 1 wherein each of the plurality of tower segments comprise a head flange and a foot flange.

4. The arrangement according to claim 3 wherein the head flange and the foot flange of the at least one uppermost tower segment comprises a plurality of bores.

5. The arrangement according to claim 3 wherein a diameter of at least one of the one or more tower segments becomes smaller upwards along the tower axis, wherein a part of an outer side of one of the one or more tower segments includes with the tower axis an angle of between 1° and 10°.

6. The arrangement according to claim 3 wherein the concrete foundation and a lowermost tower segment are directly coupled to one another.

7. The arrangement according to claim 6 wherein the concrete foundation and the lowermost tower segment are coupled to one another by releasable connecting means.

8. The arrangement according to claim 3 wherein the head flange and the foot flange of each of the one or more tower segments comprises a plurality of bores.

9. The arrangement according to claim 1 wherein the plurality of tension or traction wires are five to ten tension or traction wires that connect the concrete foundation with the head flange of the at least one uppermost tower segment under tensile stress and are spaced equidistantly relative to one another.

10. The arrangement according to claim 1 wherein at least one of the head flange and the foot flange of the at least one uppermost tower segment is formed L-shaped or T-shaped.

11. The arrangement according to claim 1 wherein each of the plurality of tension or traction wires comprise:
a tie rod arranged on the head flange of the at least one uppermost tower segment, and
a fixed anchor arranged on the concrete foundation,
wherein the tie rod has engagement means, wherein upon actuation of the engagement means, the respective tension or traction wire is placed under tensile stress.

12. The arrangement according to claim 1 wherein the tower has a height of at least 70 m.

13. The arrangement according to claim 1 wherein the plurality of tension or traction wires are five to ten tension or traction wires that connect the concrete foundation with the head flange of the uppermost tower segment under tensile stress and are spaced equidistantly relative to one another.

14. A method for erecting a steel tower for supporting a nacelle of a wind energy plant, the method comprising:
placing a first tower segment on a concrete foundation;
releasably connecting the concrete foundation and the first tower segment together;
placing one or more uppermost tower segments over the first tower segment; and
connecting the concrete foundation with the one or more uppermost tower segments by coupling a plurality of tension or traction wires to a head flange of the one or more uppermost tower segment such that the plurality of tension or traction wires couple the concrete foundation with the head flange of the one or more uppermost tower segments,
wherein all the one or more tower segments are made of steel and are supported by the concrete foundation.

15. The method according to claim 14, wherein placing the one or more uppermost tower segments over the first tower segment comprises:
setting up at least a second tower segment on the first tower segment; and
releasably connecting the first tower segment to the second tower segment by releasable connecting means.

16. A wind energy plant comprising:
the arrangement according to claim 1; and
the nacelle including a rotor supported by the tower, wherein a plurality of rotor blades are coupled to the rotor, wherein the rotor, during operation of the wind energy plant, rotates from wind and drives a generator.

* * * * *